April 25, 1950        A. T. VAN URK      2,505,265
MOVING-COIL SYSTEM WITHOUT CORE FOR A LUXMETER
COMPRISING A SELENIUM CELL
Filed Sept. 21, 1945
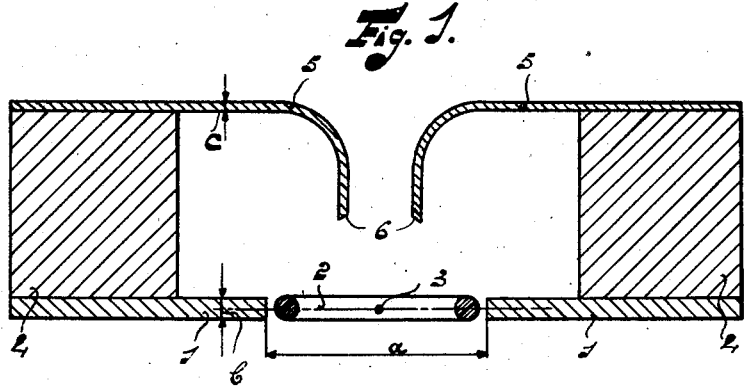
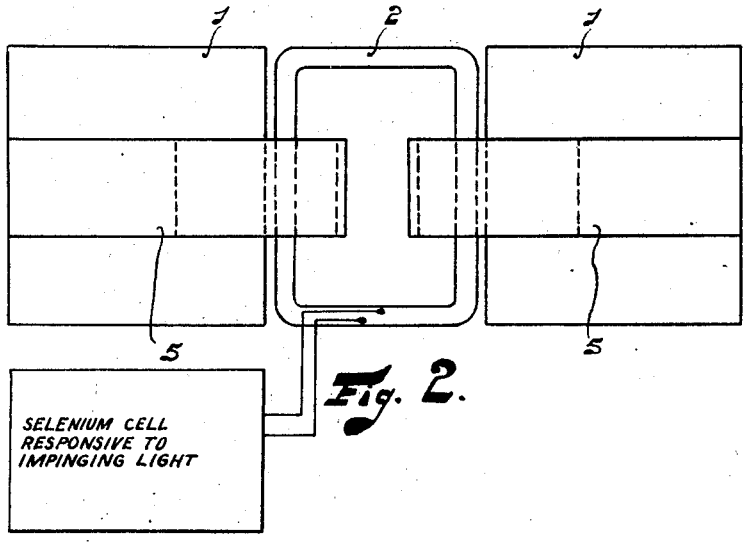
INVENTOR
AREND THOMAS VAN URK
ATTORNEY

Patented Apr. 25, 1950

2,505,265

UNITED STATES PATENT OFFICE 2,505,265

MOVING-COIL SYSTEM WITHOUT CORE FOR A LUXMETER COMPRISING A SELENIUM CELL

Arend Thomas van Urk, Eindhoven, Netherlands, assignor to Hartford National Bank & Trust Co., Hartford, Conn., as trustee Application September 21, 1945, Serial No. 617,868
In the Netherlands December 1, 1943

Section 1, Public Law 690, August 8, 1946
Patent expires December 1, 1963

3 Claims. (Cl. 171—95)

This invention relates to a moving coil system without core for a luxmeter comprising a selenium cell, in which the coil is movable between the poles of a magnetic field and on which the condition is imposed of a non-linear relation, more particularly a logarithmic relation, existing between the angular displacement of the coil and the characteristic, in the present case the quantity of light to be measured, acting upon the system. A luxmeter of this kind with a so-called logarithmic scale division has the advantage that equal percentage-wise differences in illumination can be read with the same accuracy at the beginning and the end of the scale.

When making use of a selenium cell to constitute the light sensitive element special precautions must be taken in conjunction with the nature of these cells, in order that the desired scale division just referred to, for instance for an illumination up to 3000 lux, may be obtained. An outstanding difficulty consists in that the sensitiveness of a selenium cell is not constant, but decreases above a definite illumination. To obtain the desired scale division it is desirable that the influence of this decrease in sensitiveness, which is especially manifest by the end of the scale division, should be made up for.

In the moving coil system according to the invention this is achieved by making the width of the pole shoes correspond at the most to ⅛ of their relative distance and by subjecting the coil during its movement outside the pole-shoes at least on one side to the influence of a similar pair of (auxiliary) pole shoes having the same magnetic polarity as the first-mentioned (principal) pole shoes; this may, for instance, be achieved by interconnecting somehow the corresponding principal and auxiliary pole shoes through the intermediary of magnetically conductive material, as a result of which these pole shoes simultaneously have the same magnetic potential. The latter being principally not necessary, however, the auxiliary pole shoes may be energized by a separate magnet.

It appears that the combination of principal and auxiliary pole shoes, provided they are given suitable proportions and are positioned in a suitable manner with respect to the coil, permits such a field to be obtained that the field strength at any point together with the currents obtained by means of the selenium cell brings about couples that yield the desired deflections throughout the scale. In regard to the first part of the scale the coil should generally be subjected to the action of a strongly decreasing field, which can be ensured by the first-mentioned feature i. e. that the width of the pole shoes should be at the most ⅛ of their relative distance, as a result of which the coil is located outside the pole shoes even upon small angular displacements. Over the remainder of the scale the auxiliary pole shoes yield an amplification of the magnetic field which, when making use solely of the principal pole shoes, would drop too rapidly to yield sufficient deflections of the indicating member with the decreased sensitiveness of the selenium cell in this area. It appears that when making use of the auxiliary pole shoes in the area of current intensities entering into account the field variation can practically be matched to the decrease in sensitiveness of the selenium cell.

As a rule it is advisable to make the width of the auxiliary pole shoes of the same order of magnitude as that of the principal pole shoes, preferably at the most equal thereto. Moreover, it has proved to be advantageous, if the principal and the auxiliary pole shoes are energized by one and the same magnet, to make the size of the auxiliary pole shoes in the direction of the axis of rotation of the coil smaller than the size of the principal pole shoes in this direction. Such a measure will be taken, for instance, if the field would increase too strongly with the other proportions of the magnetic circuit. Another expedient consists, for instance, in that the said dimension of the principal and auxiliary pole shoes is the same, but the magnetic resistance is different on account of the choice of the material. In the case of the principal and auxiliary pole shoes being energized by different magnets the freedom in choosing the proportions is still greater, since the value of the potential of the auxiliary pole shoes can be fixed by the choice of the separate magnet.

In a suitable form of construction the auxiliary pole shoes extend substantially parallel with the principal pole shoes and are curved inwardly at the ends facing each other in such a manner that these ends are located close to the centre of the path of the coil.

Of course, the size and the positioning of the auxiliary pole shoe depend on the conditions imposed and the selenium cell used. The expedients according to the invention permit, by variation of these elements for any case occurring in the practice, to design a system satisfying predetermined conditions.

The invention will be further described with reference to the accompanying drawing in which:

Fig. 1 is a plan view of the moving coil system of a luxmeter according to the invention; and Fig. 2 is a side view of the moving coil system of a luxmeter according to the invention.

The reference number 1 denotes the principal pole shoes that are magnetized in a manner not further indicated, for instance by a permanent magnet. The width $b$ of these pole shoes is about $\frac{1}{10}$ of the distance $a$ between the poles shoes, which corresponds to the air-gap, in which the coil 2 of the system is movable about the axis 3.

By means of schematically represented parts 4 of magnetically conductive material, for instance soft iron, a pair of auxiliary pole shoes 5 having a width $c$ are connected to the (principal) pole shoes 1 on one side. In this way the associated principal and auxiliary pole shoes have the same magnetic potential and the same magnetic polarity. The auxiliary pole shoes, which may also be provided on either side of the principal pole shoes, extend for the greater part parallel with the principal pole shoes. At the ends 6 facing each other they are curved, however, so that the ends extend along the path travelled by the coil. As appears from Figure 2 the auxiliary pole shoes in the direction of the axis of rotation of the coil are smaller than the principal pole shoes. An auxiliary field is created between the auxiliary pole tips 6 which produces an additive effect on the coil when it rotates outside the field of the main pole shoes, i. e. when the coil 2 is deflected beyond the leading edge of the main pole shoes 4, the coil begins to enter the auxiliary field created by the auxiliary poles 5.

In a practical form of construction of a luxmeter for 3000 lux the distance $a$ amounted to 20 mms., the width $b$ to 2 mms. and the width $c$ to 1 mm. The height of the auxiliary pole-shoes indicated in Figure 2 amounted to about $\frac{1}{3}$ of the height of the principal pole shoes, the distance between the ends of the auxiliary pole shoes amounting to 6 mms.

What I claim is:

1. In a light meter, a moving coil system comprising a pair of complementary principal pole members facing each other and spaced apart to form therebetween a magnetic field, a coil member rotatably mounted between said principal pole members, said principal pole members having a width smaller than about one-eighth of the distance between said principal pole members, and auxiliary pole members magnetically coupled to said principal pole members and arranged on the same side of a plane passing through the principal pole members, said auxiliary pole members having end portions adjacent to the path of said coil thereby to produce an angular deflection of said coil non-linearly proportional to an electric current flowing through said coil member.

2. In a light-meter, a moving coil system comprising a pair of principal complementary magnetic pole members facing each other and spaced apart to form therebetween a magnetic field, a coil member rotatably mounted between said principal pole members, said pole members having a width smaller than about one-eighth of the distance between said pole members, and auxiliary pole members magnetically coupled to said principal pole members said auxiliary pole members having a thickness substantially less than that of the principal pole members and having end portions adjacent to the path of said coil thereby to produce an angular deflection of said coil non-linearly proportional to an electric current flowing through said coil member.

3. In a light-meter, a moving coil system comprising a pair of principal complementary magnetic pole members facing each other and spaced apart to form therebetween a magnetic field, a coil member rotatably mounted between said principal pole members, said principal pole members having a width smaller than about one-eighth of the distance between said pole members, and auxiliary pole members magnetically coupled to said principal pole members, said auxiliary pole members having a thickness substantially less than that of said principal pole members and arranged on one side of a plane passing through said principal pole member and having the major portions thereof extending substantially parallel to said principal pole members and end portions curved in the direction of the pivotal axis of and adjacent to the path of said coil thereby to produce an angular deflection of said coil logarithmically proportional to an electric current flowing through said coil member.

AREND THOMAS van URK.

REFERENCES CITED

The following references are of record in the file of this patent:

UNITED STATES PATENTS

| Number | Name | Date |
| --- | --- | --- |
| 1,118,678 | Patrick | Nov. 24, 1914 |
| 1,379,166 | Case | May 24, 1921 |
| 1,932,911 | Rolfe | Oct. 31, 1933 |
| 2,044,789 | Hefde | June 23, 1936 |
| 2,332,877 | Villard | Oct. 26, 1943 |
| 2,346,529 | Whittenton | Apr. 11, 1944 |

FOREIGN PATENTS

| Number | Country | Date |
| --- | --- | --- |
| 518,919 | Great Britain | Mar. 12, 1940 |